Figure 1:
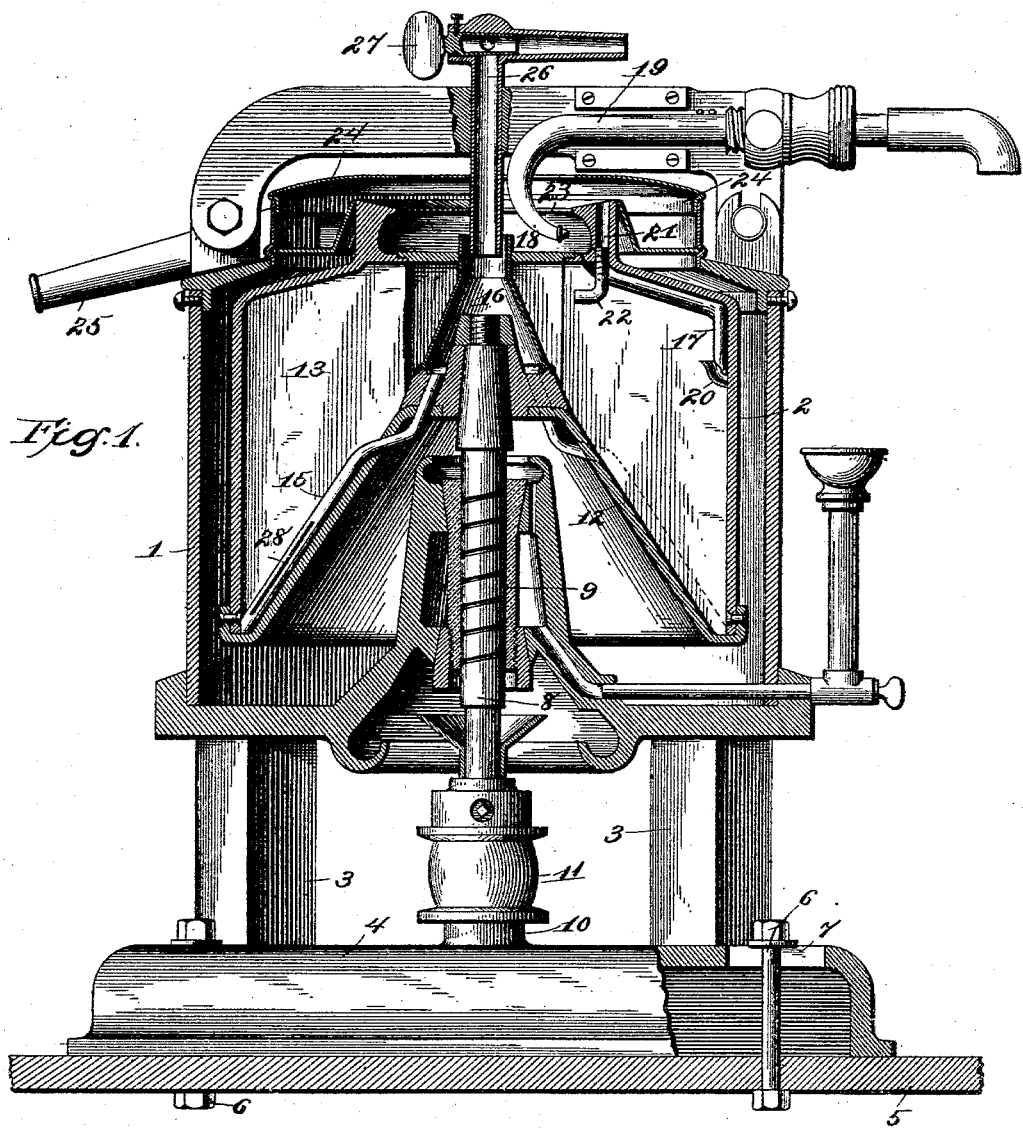

(No Model.) 2 Sheets—Sheet 1.

T. H. SPRINGER.
CENTRIFUGAL CREAMER.

No. 561,829. Patented June 9, 1896.

Witnesses:
E. C. Wurdeman
J. S. Williamson

Inventor
Thomas H. Springer
By Geo. H. Holgate
Attorney (No Model.) 2 Sheets—Sheet 2.
T. H. SPRINGER.
CENTRIFUGAL CREAMER.
No. 561,829. Patented June 9, 1896.
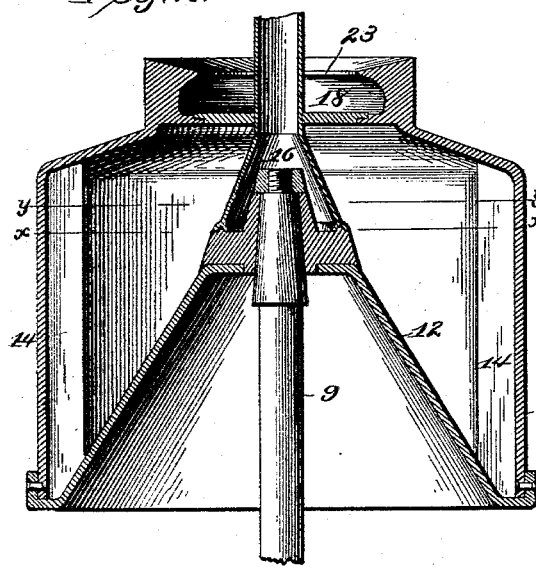
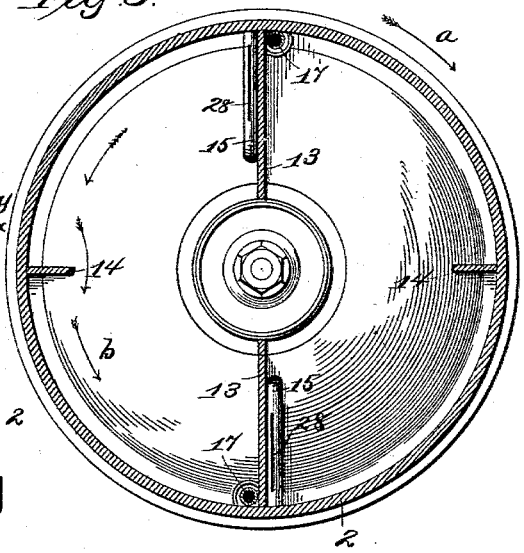
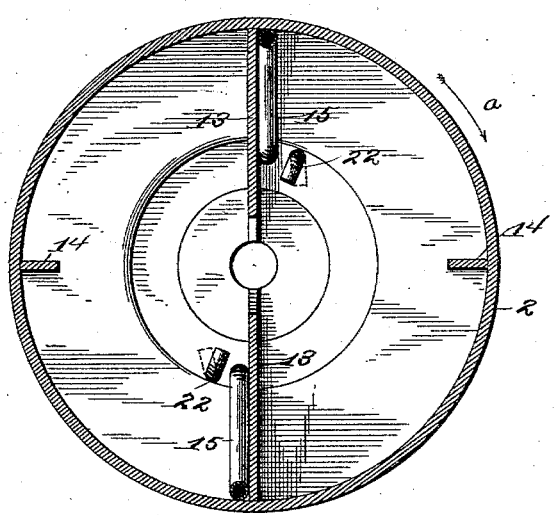
Witnesses:
E. C. Wurdeman
J. J. Williamson
Inventor
Thomas H. Springer
by Geo. H. Holgate
Attorney

UNITED STATES PATENT OFFICE.

THOMAS H. SPRINGER, OF PHILADELPHIA, PENNSYLVANIA.

CENTRIFUGAL CREAMER.

SPECIFICATION forming part of Letters Patent No. 561,829, dated June 9, 1896.

Application filed October 22, 1895. Serial No. 566,549. (No model.)

*To all whom it may concern:*

Be it known that I, THOMAS H. SPRINGER, a citizen of the United States, residing at Philadelphia, in the county of Philadelphia and State of Pennsylvania, have invented certain new and useful Improvements in Scum and Dirt Arresters for Centrifugal Machines, of which the following is a full, clear, and exact specification.

My invention relates to a new and useful improvement in centrifugal machines for separating cream from milk, and has for its object to so improve upon the construction of such machines as to increase their efficiency, prevent churning of the milk, render the adjustment of the cream-outlet simple and capable of carrying off the cream at any desired consistency, permitting the cream on its outflow from the bowl to be thrown by centrifugal force within the cream-reservoir beyond the meeting edge of the stationary and revolving parts of the machine, preventing leakage, and to provide for the adjusting of the drive-belt; and with these ends in view my present invention consists in the details of construction and combination of elements hereinafter set forth, and then specifically designated by the claims.

In order that those skilled in the art to which this invention appertains may understand how to make and use the same, I will describe its construction and operation in detail, referring by number to the accompanying drawings, forming part of this specification, and in which—

Figure 1 is a central vertical section of my improved separator, the several parts being in proper position for operation; Fig. 2, a similar view of the bowl, taken at right angles to Fig. 1; Fig. 3, a section at the line $y\ y$ of Fig. 2, and Fig. 4 a section at the line $x\ x$.

Similar numerals denote like parts in the several views of the drawings.

Heretofore great difficulty has been experienced in separators of this class from the fact that the milk was placed in the bowl, and as said bowl was not provided with partitions which divided it into compartments, but only partitions of a description which represent paddles, a bowl using to any amount the inertia of the milk caused it to be lashed by these paddles, which churned the milk and caused it to form butter globules, which deteriorated its quality and value, and this construction also renders a machine less efficient than my improved machine, in that the milk was permitted to have a motion less than that of the bowl, whereby all of the centrifugal force generated by the rapid revolving of said bowl was not imparted to said milk, and as the efficiency of a separator is dependent upon the centrifugal force imparted to the milk therein it follows that if the full speed of the bowl is not imparted to the milk to that extent the separation of the cream therefrom is retarded. This disadvantage I have overcome in my present improved construction, as well as otherwise facilitating the operation of separation and increasing the quality of the milk after being operated upon, which will now be described.

1 represents the casing of a machine, in which the bowl 2 is adapted to revolve, and this casing is provided with suitable standards 3, formed with or secured to the base 4, which latter is adapted to rest upon the plate 5.

6 are bolts passed through the plate 5 and slots 7 in the base, so that this base and the machine carried thereby may be adjusted upon the plate, as will be readily understood, and secured in any adjustment within the limits of the slots 7 by tightening the bolts in the usual manner, the object of which will be presently explained.

The bowl 2 is mounted upon the upper end of the spindle 8 in the usual manner, and said spindle is adapted to run in the bearings 9 and 10, suitable means being provided for lubricating said bearings and receiving the waste oil; but as this forms no part of my present invention I will not enter into a detailed description thereof.

11 is a flanged crown-pulley upon the lower portion of the spindle 8, and adapted to receive a drive-belt from any convenient source of power, by which the spindle and the bowl 2, carried thereby, are caused to revolve. Thus it will be seen that this belt may be tightened or loosened by the adjustment of the base upon the plate 5, as before described.

The bottom of the base is formed in the shape of a cone 12 and the bowl is divided in two compartments by the partition 13, which extends from this cone-shaped bottom to the side walls of the bowl, as clearly shown in Figs. 3 and 4, and each compartment is provided with a wing 14, extending vertically midway between the partitions and secured to the outer wall of the bowl. These wings project inward to a distance sufficient to cause the milk flowing from one end of a compartment to the other to be deflected inward for the purpose hereinafter set forth, as indicated by the arrows.

15 are the induction-pipes, by which milk is fed from the usual cone-chamber 16 to the bowl, and each of these pipes leads to one of the compartments just back of the partitions, as clearly shown in Figs. 3 and 4.

17 are the skim-milk-outlet tubes, which lead one from each of the compartments to the skim-milk chamber 18, from whence said skim-milk is carried off by the usual curved pipe 19 to a suitable receptacle. The inner ends of these skim-milk tubes are partially inclosed by the dirt-arresters 20 for the purpose of preventing the choking up of said tubes by the accumulation of sediment within their open ends. The casing around the skim-milk chamber 18 is made sufficiently thick to permit the forming of the holes 21 therethrough, in which are threaded the cream-outlet tubes 22, which latter are bent at right angles at their lower portions and project inward and are so arranged as to be turned upon their axes for the purpose of presenting their open ends to the inflow of the cream nearer to or farther from the center of the bowl, and as the cream is thicker nearest the center of the bowl and decreases in consistency as it nears the circumference thereof it follows that the position of the open ends of these tubes relative to the center of the bowl will determine the consistency of the cream drawn therefrom. The upper surface 23 of the casing, which surrounds the skim-milk chamber 18, is chambered or flared upward, so that as the cream flows upward through the holes 21 it emerges upon this inclined surface and will be thrown by centrifugal force outward and upward upon approximately the angle of the surface, causing it to be projected beyond the meeting edges of the revolving casing and the cream-reservoir 24. This is of great importance in machines of this class, since it prevents leakage between the stationary and revolving parts of the device, which has been found very objectionable. The cream, after being thrown into the reservoir, is drawn off through the spout 25 in the usual manner.

From this description the operation of my improvement will be obviously as follows: The pipe 26 being connected with the source of milk supply by flexible or other tubing, and the valve 27 being turned so as to permit the milk to flow through the tube 26 into the cone-chamber 16, and the bowl being given a rotary motion at high speed, said milk will flow downward through the tubes 15 and be admitted to the compartments of the bowl through the slots 28 near the bottom of said bowl, and as this milk is confined between the partitions 13 within the compartments it follows that it will revolve at the same rate of speed as the bowl, and the centrifugal force imparted to this milk will cause the cream to separate therefrom and lift it to near the center of the bowl, while the skim-milk, which is heavier than said cream, will be forced toward the circumference. Now as the bowl revolves in the direction indicated by the arrow $a$ in Figs. 3 and 4 the milk admitted by the tubes 15 will have a tendency to flow in the direction indicated by the arrows $b$ and in passing the wings 14 will be deflected toward the center of the bowl, so that any cream remaining therein will be lifted in proximity to this center, when the milk again returns toward the circumference, thus obviating the difficulty which has been heretofore occasioned in compelling the cream to pass through the body of the milk in finding its way to the center.

As is well understood by those skilled in the art to which this class of devices appertains the centrifugal force of the bowl imparted to the milk will cause it to rise in the skim-milk tubes 17 to the skim-milk chamber 18, and from thence it will be forced by this same centrifugal action through the curved pipe 19 to the proper receptacle, and the cream by this same action will be caused to flow through the cream-tubes 22 and be projected within the cream-reservoir 24, as before described, thus making room for a continuous inflow of fresh milk through the induction-tubes 15. By this process a continuous current of milk and cream will be produced in the compartments of the bowl in the direction indicated by the arrows $b$.

Having thus fully described my invention, what I claim as new and useful is—

1. In a centrifugal separator, the bowl 2, having partitions 13, which divide its interior into two compartments, induction-tubes for feeding milk to said compartments, wings for deflecting the flow of milk, skim-milk tubes for drawing off the milk after separation, outlet-tubes adapted to be adjusted to or from the center of the bowl and a casing arranged at the top of the bowl having an inclined surface, as and for the purpose described.

2. In combination with the bowl of a milk-separator, the partitions 13, for dividing the interior of said bowl into two compartments, suitable induction and outlet tubes, wings 14, for deflecting the flow of milk admitted to and drawn from said compartments, and a casing having an inclined surface, adapted to receive the cream upon its outflow from the bowl and projected into the cream-reservoir, whereby leakage is prevented, as specified.

In testimony whereof I have hereunto affixed my signature in the presence of two subscribing witnesses.

T. H. SPRINGER.

Witnesses:
ALLISON W. MCCURDY,
S. S. WILLIAMSON.